US012081927B2

(12) United States Patent
Gibb et al.

(10) Patent No.: US 12,081,927 B2
(45) Date of Patent: Sep. 3, 2024

(54) AUDIO APPARATUS

(71) Applicant: Sawmill Creek Investments Ltd., Surrey (CA)

(72) Inventors: Brad Gibb, Surrey (CA); Wyatt Eduardo Gibb, Surrey (CA)

(73) Assignee: Sawmill Creek Investments Ltd., Surrey (CA)

(*) Notice: Subject to any disclaimer, the term of this patent is extended or adjusted under 35 U.S.C. 154(b) by 206 days.

(21) Appl. No.: 17/883,371

(22) Filed: Aug. 8, 2022

(65) Prior Publication Data

US 2023/0043551 A1 Feb. 9, 2023

Related U.S. Application Data

(60) Provisional application No. 63/230,246, filed on Aug. 6, 2021.

(51) Int. Cl.
*H04R 1/02* (2006.01)
*H04R 1/26* (2006.01)
*H04R 5/02* (2006.01)

(52) U.S. Cl.
CPC .................................... *H04R 1/02* (2013.01)

(58) Field of Classification Search
CPC ...... H04R 1/02; H04R 5/02; H04R 2205/026; H04R 1/26; H04R 1/028
USPC .................... 381/332, 87, 89, 335, 336, 386
See application file for complete search history.

(56) References Cited

U.S. PATENT DOCUMENTS 6,993,147 B2 * 1/2006 Guenther ............... H04R 11/02 381/409
8,139,805 B2 3/2012 Tsai

* cited by examiner

*Primary Examiner* — Thjuan K Addy
(74) *Attorney, Agent, or Firm* — Oyen Wiggs Green & Mutala LLP

(57) ABSTRACT

An audio apparatus has a housing, speakers, a subwoofer, and an amplifier. The housing has an upper surface, a lower surface, a lateral surface, and connectors. The upper surface has an upper edge, with the upper surface having first and second upper surfaces. The lower surface has a lower edge, with the lower surface having first and second lower surfaces. The lateral surface extends from the upper edge to the lower edge, with the lateral surface having first and second lateral surfaces and speaker openings. The first upper surface, the first lower surface, and the first lateral surface define a first portion of the housing. The second upper surface, the second lower surface, and the second lateral surface define a second portion of the housing. The first portion is connected to the second portion by the connectors. Each of the speakers is mounted over one of the speaker openings. The subwoofer is mounted to the lower surface. The amplifier is mounted to the housing, with the amplifier in communication with the one or more speakers and with the subwoofer to generate sound from the one or more speakers and the subwoofer.

20 Claims, 3 Drawing Sheets

AUDIO APPARATUS

CROSS-REFERENCE TO RELATED APPLICATIONS

This application claims the benefit of U.S. Provisional Patent Application No. 63/230,246 filed Aug. 6, 2021, the contents of which are hereby incorporated by reference in its entirety.

FIELD OF THE INVENTION

The present invention relates to an audio apparatus, and in particular, to an audio apparatus that take the form of a wine barrel.

BACKGROUND OF THE INVENTION

Wine barrels are typically used to hold wine while the wine is aged. Generally, wine barrels are constructed from oak, although other types of wood may also be used. Wine barrels are generally cylindrical in shape, with the middle of the barrels somewhat larger in diameter than at the ends.

Audio systems are commonly found in homes and provide audio (e.g. music) playback. Audio systems may comprise a number of components, including speakers, amplifiers, and subwoofers. Because of the separate components used to form audio systems, storage solutions for audio systems are typically required to store and house the components. Such storage solutions may include cabinets or shelves.

It is therefore desirable for an audio apparatus that is able to provide audio playback while at the same time providing storage for the audio system components.

SUMMARY OF THE INVENTION

In accordance with one embodiment of the invention, an audio apparatus comprises a housing, one or more speakers, a subwoofer, and an amplifier. The housing comprises an upper surface, a lower surface, a lateral surface, and one or more connectors. The upper surface has an upper edge, with the upper surface comprising first and second upper surfaces. The lower surface has a lower edge, with the lower surface comprising first and second lower surfaces. The lateral surface extends from the upper edge to the lower edge, with the lateral surface comprising first and second lateral surfaces and one or more speaker openings. The first upper surface, the first lower surface, and the first lateral surface define, at least in part, a first portion of the housing. The second upper surface, the second lower surface, and the second lateral surface define, at least in part, a second portion of the housing. The first portion is connected to the second portion by the one or more connectors. Each of the one or more speakers is mounted over one of the speaker openings. The subwoofer is mounted to the lower surface. The amplifier is mounted to the housing, with the amplifier in communication with the one or more speakers and with the subwoofer to generate sound from the one or more speakers and the subwoofer.

In accordance with another embodiment, the one or more connectors are adapted to allow the housing to transition from an open configuration to a closed configuration and vice versa. In the closed configuration, the upper surface and the lower surface are substantially circular. In the open configuration, the first and second portions are angled away from each other to allow for access to an interior of the housing.

In accordance with yet another embodiment, the first upper surface comprises a first upper curved edge and a first upper linear edge. The second upper surface comprises a second upper curved edge and a second upper linear edge. In the closed configuration, the first upper linear edge and the second upper linear edge meet, and the first upper curved edge and the second upper curved edge form substantially a circle.

In accordance with still another embodiment, the first lower surface comprises a first lower curved edge and a first lower linear edge. The second lower surface comprises a second lower curved edge and a second lower linear edge. In the closed configuration, the first lower linear edge and the second lower linear edge meet, and the first lower curved edge and the second lower curved edge form substantially a circle.

In accordance with still yet another embodiment, the one or more connectors are hinge connectors that are adapted to allow the first and second portions to move hingedly with respect to each other.

In accordance with still a further embodiment, the housing further comprises one or more shelves extending from the lateral surface into an interior of the housing.

In accordance with yet a further embodiment, the housing further comprises a plurality of casters mounted to the lower surface.

In accordance with another embodiment, the one or more speaker openings comprise two speaker openings, and the one or more speakers comprise two speakers.

In accordance with yet another embodiment, the two speaker openings are horizontally aligned with each other.

In accordance with still another embodiment, the two speaker openings are angled between approximately 90° and 150° apart from each other.

In accordance with still yet another embodiment, the two speaker openings are angled approximately 120° apart from each other.

In accordance with a further embodiment, the lateral surface further comprises a lateral opening horizontally aligned with the two speaker openings and located midway between the two speaker openings.

In accordance with still a further embodiment, the housing is in a shape of a wine barrel.

In accordance with yet a further embodiment, the housing is constructed from a wine barrel.

In accordance with another embodiment, the first portion is larger than the second portion.

In accordance with yet another embodiment, the first portion is between approximately 50% and 75% of a volume of the housing.

In accordance with a further embodiment, the speaker openings are on the first lateral surface.

In accordance with still a further embodiment, the subwoofer is mounted to the first lower surface.

In accordance with still yet a further embodiment, the amplifier is mounted to the lateral surface.

In accordance with yet a further embodiment, the amplifier is mounted to the first lateral surface.

The foregoing was intended as a summary only and a description of only some of the aspects of the invention. It was not intended to define the limits or requirements of the invention. Other aspects of the invention will be appreciated by reference to the detailed description of the preferred embodiments.

BRIEF DESCRIPTION OF THE DRAWINGS

The invention will be described by reference to the detailed description of the embodiments and to the drawings thereof in which.

DETAILED DESCRIPTION OF THE INVENTION

Figure 1:
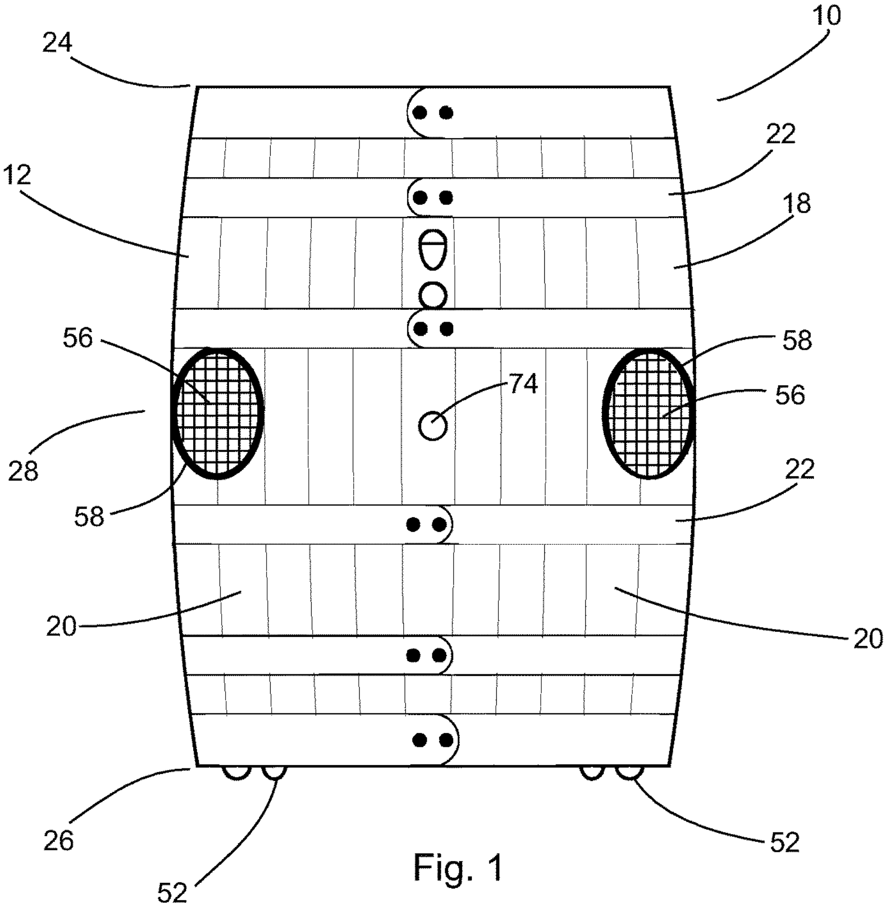
FIG. 1 is a front view of the audio apparatus in accordance with an embodiment of the invention, in a closed configuration.

Referring to FIG. 1, according to one embodiment of the invention, an audio apparatus 10 comprises a housing 12. Preferably, the housing 12 has a general shape of a wine barrel. More preferably, the housing 12 may comprise a wine barrel. For example, the housing 12 may be generally cylindrical in shape, comprising a substantially circular upper surface 14 and a substantially circular lower surface 16. The upper surface 14 has an upper circumference 15, and the lower surface 15 has a lower circumference 17. The housing 12 further comprises a lateral surface 18 extending from the upper circumference 15 to the lower circumference 17, with the lateral surface 18 preferably extending from a circumference of the upper surface 14 to a circumference of the lower surface 16. The lateral surface 18 may comprise a plurality of generally vertical staves 20 extending between the upper surface 14 and the lower surface 16. The staves 20 may be constructed from wood, such as oak or other types of wood typically used in wine barrels. The housing 12 may further comprise one or more generally horizontal hoops 22 adapted to bind the staves 20 together to form the general shape of the housing 12. The hoops 22 may be secured to the staves 20 using mechanical connectors, such as rivets.

The lateral surface 18 comprises an upper end 24 and a lower end 26. The upper surface 14 is connected to the lateral surface 18 proximate to the upper end 24, while the lower surface 16 is connected to the lateral surface 18 proximate to the lower end 26. The upper end 24 of the lateral surface 18 preferably extends past the upper surface 14, such that the upper surface 14 is slightly recessed from the upper end 24. Similarly, the lower end 26 of the lateral surface 18 preferably extends past the lower surface 16, such that the lower surface 16 is slightly recessed from the lower end 26.

Preferably, the housing 12 is bulged outwards, such that a diameter of the housing 12 proximate to the upper end 24 or the lower end 26 is less than a diameter of the housing 12 proximate to a central portion 28 of the lateral surface 18, with the central portion 28 in between the upper end 24 and the lower end 26.

Preferably, in one embodiment, the housing 12 is between approximately 2.5 feet and approximately 3.5 feet high; more preferably, the housing 12 is approximately 3 feet high. Preferably, in one embodiment, the diameter of the housing 12 proximate to the upper and lower ends 24, 26 is approximately 24 inches, with the diameter of the housing 12 at a maximum of approximately 28 inches proximate to the central portion 28.

The housing 12 may be separated into two portions: a first portion 30 and a second portion 32. For example, the first and second portions 30, 32 may be formed by cutting a wine barrel along a substantially vertical plane. Preferably, the first and second portions 30, 32 are not identical in size. For example, in the embodiment shown in FIGS. 1 to 7, the first portion 30 is larger in size than the second portion 32. This may be accomplished, for example, by cutting the wine barrel along a substantially vertical plane that is offset from a diameter of the wine barrel. Preferably, the first portion 30 is between approximately 50% to approximately 75% of a volume of the housing 12; more preferably, the first portion 39 is approximately 66% of the volume of the housing 12.

In order to allow for the housing 12 to be separated into the first and second portions 30, 32, the upper surface 14 comprises a first upper surface 40 and a second upper surface 46. The lower surface 16 comprises a first lower surface 42 and a second lower surface 48. The lateral surface 18 comprises a first lateral surface 44 and a second lateral surface 50.

The first portion 30 is generally defined, at least in part, by the first upper surface 40, the first lower surface 42, and the first lateral surface 44. The second portion 32 is generally defined, at least in part, by the second upper surface 46, the second lower surface 48, and the second lateral surface 50.

The first upper surface 40 comprises a first upper curved edge 76 and a first upper linear edge 78. The first lower surface 42 comprises a first lower curved edge 80 and a first lower linear edge 82. The first lateral surface 44 extends from the first upper curved edge 76 to the first lower curved edge 80. The first lateral surface 44 comprises two first lateral edges 34.

The second upper surface 46 comprises a second upper curved edge 84 and a second upper linear edge 86. The second lower surface 48 comprises a second lower curved edge 88 and a second lower linear edge 90. The second lateral surface 50 extends from the second upper curved edge 84 to the second lower curved edge 88. The second lateral surface 50 comprises two second lateral edges 36.

The first portion 30 and the second portion 32 are preferably connected together, with one of the first lateral edges 36 connected to one of the second lateral edges 38. Preferably, one of the first lateral edges 36 is connected to one of the second lateral edges 38 using one or more connectors 38. The connectors 38 may comprise hinge connectors, although other types of connectors are also possible. Where the connectors 38 are hinge connectors, the connectors 38 are adapted to allow the first and second portions 30, 32 to move hingedly with respect to each other, to transition the housing 12 from a closed configuration (as shown in FIGS. 1 to 3) to an open configuration (as shown in FIGS. 4 to 7) and vice versa.

Figure 2:
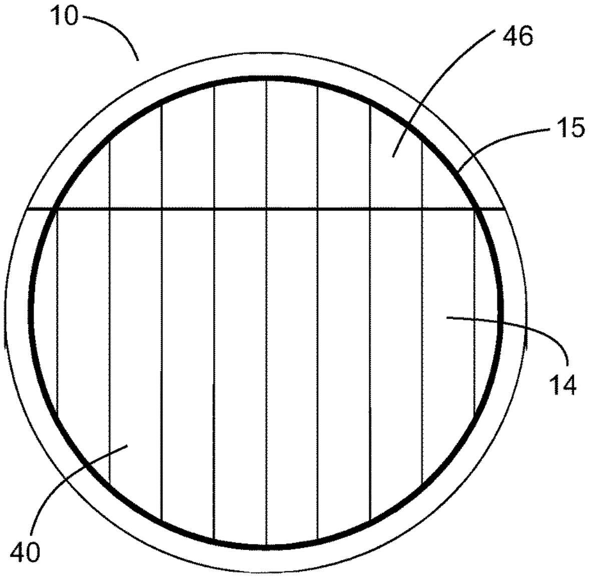
FIG. 2 is a top view of the audio apparatus of FIG. 1, in a closed configuration.
Figure 3:
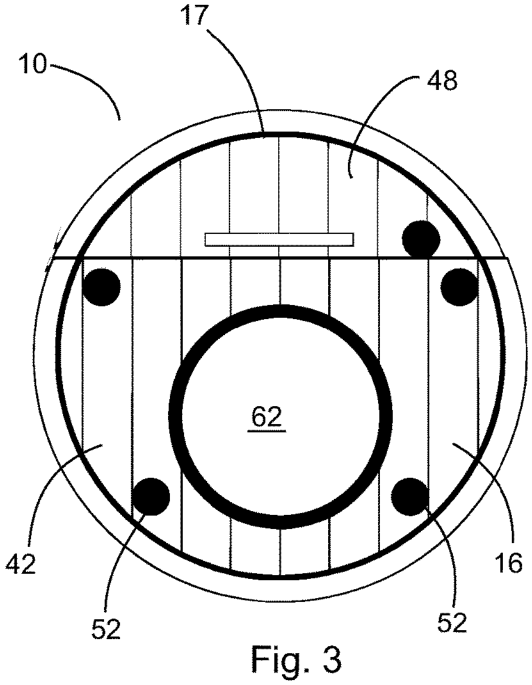
FIG. 3 is a bottom view of the audio apparatus of FIG. 1, in a closed configuration.
Figure 4:
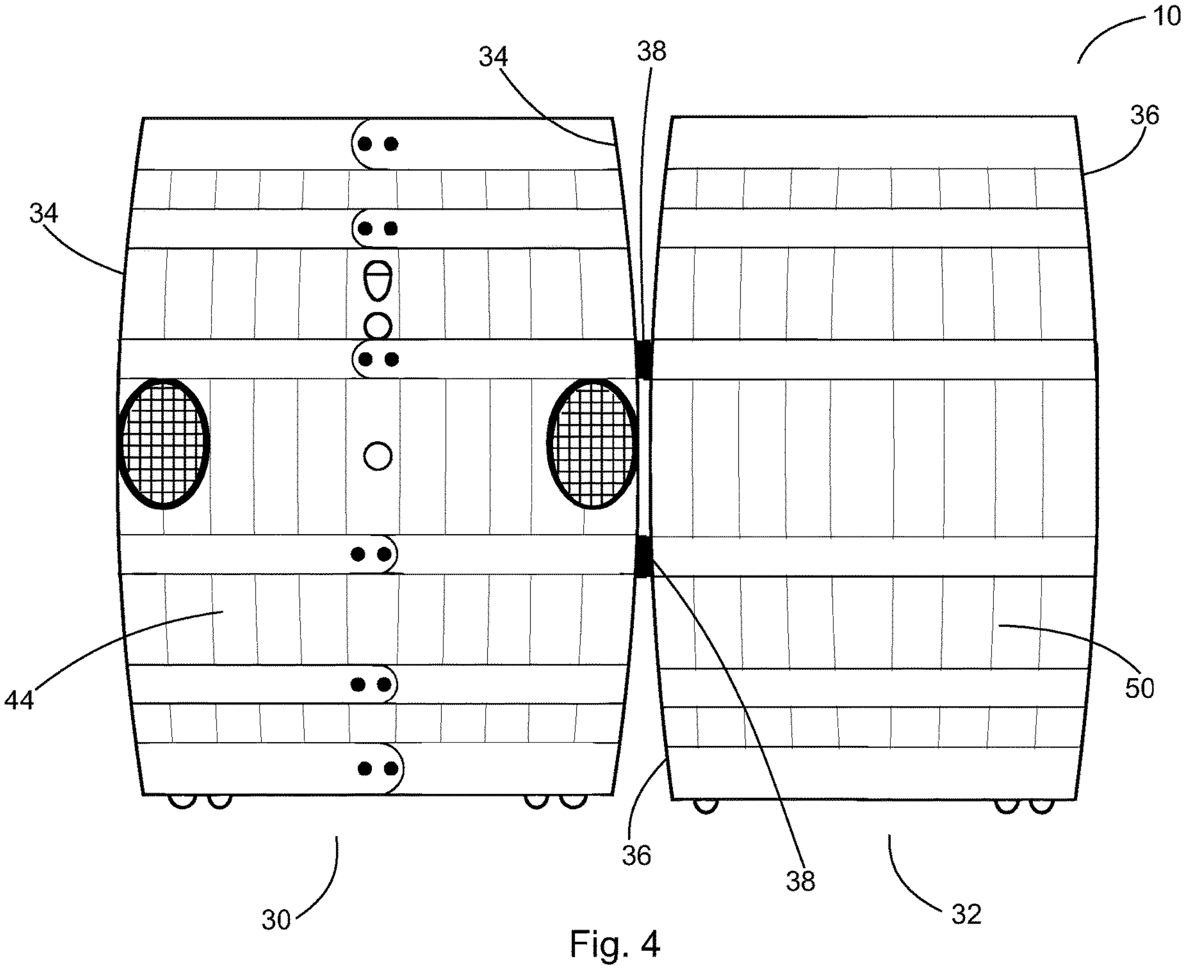
FIG. 4 is a front view of the audio apparatus of FIG. 1, in an open configuration.
Figure 5:
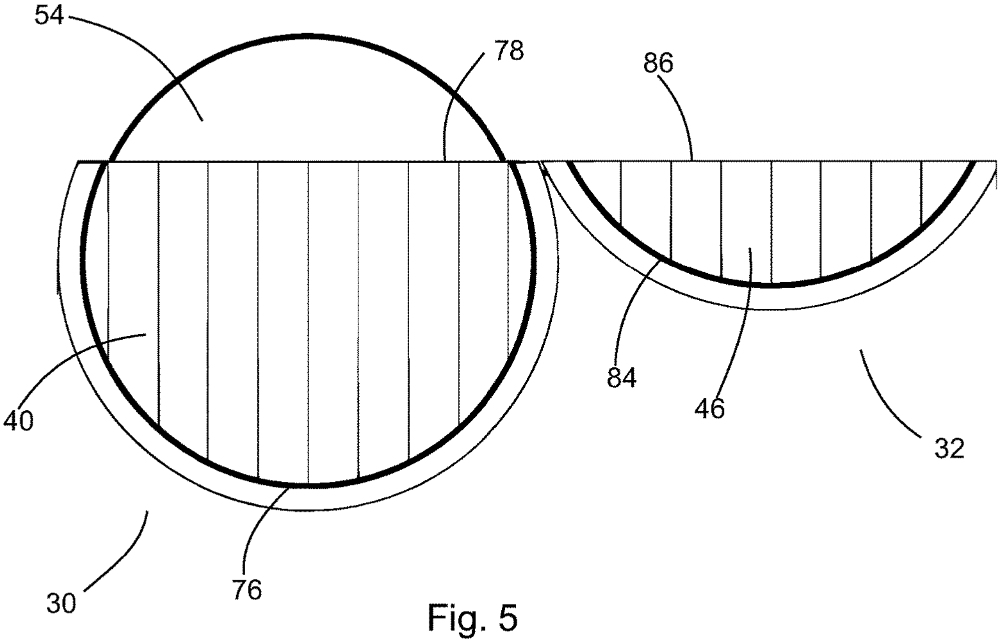
FIG. 5 is a top view of the audio apparatus of FIG. 1, in an open configuration.

Referring to FIGS. 1 to 3, when the housing 12 is in the closed configuration, the first lateral edges 34 meet with the second lateral edges 36, the first upper linear edge 78 meets with the second upper linear edge 86, and the first lower linear edge 82 meets with the second lower linear edge 90, with the housing 12 having a general shape of a wine barrel. When the housing 12 is in the open configuration, the first and second portions 30, 32 are preferably angled apart from each other, allowing for access to an interior of the housing 12.

When the housing 12 is in the closed configuration, the first upper surface 40 and the second upper surface 46 generally define the upper surface 14. Similarly, the first lower surface 42 and the second lower surface 48 generally define the lower surface 16. As described above, the upper surface 14 and the lower surface 16 are preferably circular in shape. Therefore, preferably, when the housing 12 is in the closed configuration, the first upper curved edge 76 and the second upper curved edge 84 form a circle, while the first lower curved edge 80 and the second lower curved edge 88 also form a circle. Preferably, the first upper surface 40 and the first lower surface 42 are substantially similar in dimensions, and the second upper surface 46 and the second lower surface 48 are substantially similar in dimensions.

Furthermore, the first lateral surface 44 and the second lateral surface 50 generally define the lateral surface 18 when the housing 12 is in the closed configuration. Preferably, the first lateral surface 44 and the second lateral surface 50 form a substantially continuous curved surface when the housing 12 is in the closed configuration.

The housing 12 preferably further comprises a plurality of casters 52 mounted on the lower surface 16. The casters 52 are configured to allow for the housing 12 to be moved from one location to another location. In the embodiment shown in FIGS. 1 to 7, the casters 52 comprise five casters 52, with four of the casters 52 mounted on the first lower surface 44 and one of the casters 52 mounted on the second lower surface 48. However, it is understood that other arrangements and numbers of the casters 52 are also possible.

Figure 6:
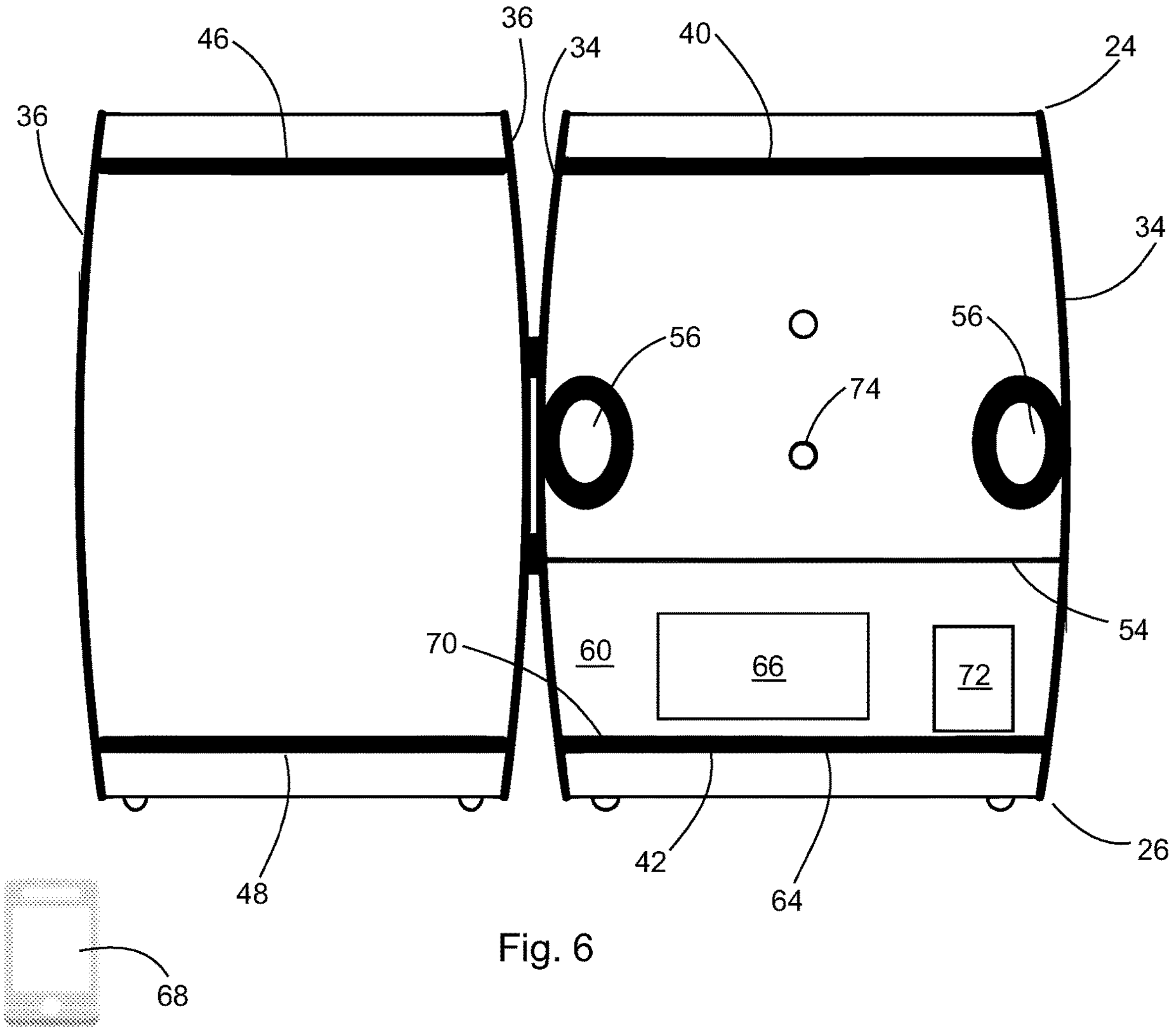
FIG. 6 is a rear view of the audio apparatus of FIG. 1, in an open configuration.
Figure 7:
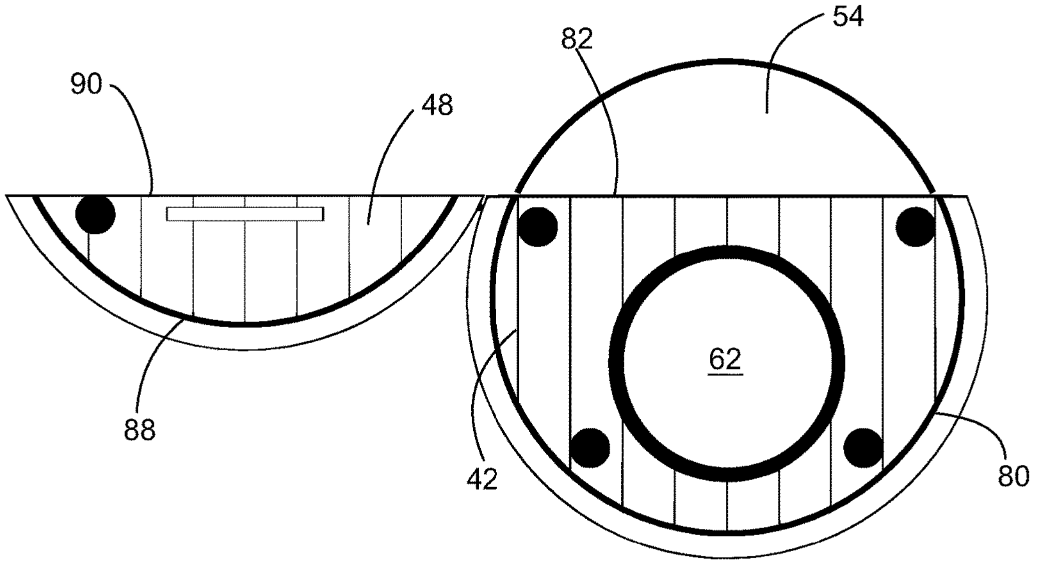
FIG. 7 is a bottom view of the audio apparatus of FIG. 1, in an open configuration.

Referring to FIG. 6, the housing 12 preferably comprises one or more shelves 54 that extend generally horizontally within the lateral surface 18. The one or more shelves 54 may be adapted to store items within the housing 12. In the embodiment shown in FIG. 6, the one or more shelves 54 comprise a single shelf 54 extending from the first lateral surface 44 in between the first upper surface 40 and the first lower surface 42. However, it is understood that multiple ones of the shelves 54 may be present, each extending from either the first lateral surface 44 or the second lateral surface 50. In the embodiment shown in FIGS. 4 to 7, the shelf 54 extends beyond the first lateral edges 34, such that when the housing 12 is in the closed configuration, the shelf 54 extends, at least partially, into the second portion 32. However, it is understood that it is also possible that the shelf 54 does not extend beyond the first lateral edges 34, such that when the housing 12 is in the closed configuration, the shelf 54 does not extend into the second portion 32.

The audio apparatus 10 further comprises one or more speakers 56 for projecting sound from the audio apparatus 10. The lateral surface 18 comprises one or more speaker openings 58 over which the speakers 56 may be mounted. Preferably, the speaker openings 58 are located on the first lateral surface 44, although it is also possible for one or more of the speaker openings 58 to be located on the second lateral surface 46. In the embodiment shown in FIGS. 1 to 7, the speaker openings 58 comprise two speaker openings 58, with one of the speakers 56 mounted to each of the speaker openings 58. Preferably, the speakers 56 are mounted on an interior lateral surface 60 of the lateral surface 18, with the speaker openings 58 adapted to allow sound from the speakers 56 to be projected away from the audio apparatus 10.

The speaker openings 58 are preferably substantially horizontally aligned with each other and are located proximate to the central portion 28 of the lateral surface 18. In one embodiment, where the speaker openings 58 comprise two speaker openings 58, the two speaker openings 58 are preferably angled apart from each other at an angle of between approximately 90° and approximately 150°. More preferably, the two speaker openings 58 are preferably angled apart from each other at an angle of approximately 120°.

The audio apparatus 10 further preferably comprises a subwoofer 62 for reproducing lower audio frequencies from the audio apparatus 10. The subwoofer 62 may be mounted to an exterior lower surface 64 of the lower surface 16, such that the subwoofer 62 is oriented to face generally downwards. Preferably, the subwoofer 62 is located on the first lower surface 42, although it is also possible for the subwoofer 62 to be located on the second lower surface 48.

The audio apparatus 10 further comprises an amplifier 66 adapted to receive input from an audio source 68 for output to the speakers 56 and the subwoofer 62. The audio source 68 may be located external to the housing 12. The amplifier 66 may be mounted to housing 12, preferably between the lower surface 16 and one of the shelves 54. For example, in one embodiment, the amplifier 66 may be mounted to the lateral surface 18 between the lower surface 16 and the shelf 54, as shown in FIG. 6. In this embodiment, the amplifier 66 may be mounted to the first lateral surface 44, although it is also possible for the amplifier 66 to be mounted to the second lateral surface 50. In another embodiment, the amplifier 66 may be mounted to an interior lower surface 70 of the lower surface 16.

The amplifier 66 may be configured to communicate wirelessly with the audio source 68, such as through Bluetooth or some other communications protocol. The audio source 68 may be a mobile device or some other suitable device for communicating with the amplifier 66. The amplifier 66 may be connected, either wiredly or wirelessly, to the speakers 56 and the subwoofer 62 in order to effect playback of audio through the speakers 56 and the subwoofer 62.

The audio apparatus 10 further comprises a power supply 72 for supplying electrical power to the amplifier 66, the speakers 56, and the subwoofer 62. The power supply 72 may comprise one or more batteries. Alternatively, the power supply 72 may be connected to mains electricity.

Referring to FIG. 1, the lateral surface 18 further comprises a lateral opening 74. Preferably, the lateral opening 74 is substantially horizontally aligned with the speaker openings 58. In one embodiment, where the speaker openings 58 comprise two speaker openings 58, the lateral opening 74 is preferably located approximately midway between the two speaker openings 58. In the embodiment shown in FIGS. 1 to 7, the lateral opening 74 is located on the first lateral surface 44, although it is also possible for the lateral opening 74 to be located on the second lateral surface 50. The lateral opening 74 is configured to improve airflow between the speakers 56 and may help to reduce port turbulence.

In one embodiment, the housing 12 may be formed by using a wine barrel, with the two heads of the wine barrel forming the upper and lower surfaces 14, 16 of the housing 12 and the staves of the wine barrel forming the lateral surface 18 of the housing 12. In order to form the first and second portions 30, 32, the wine barrel may be cut along a substantially vertical plane (i.e. along a longitudinal plane of the wine barrel). The first and second portions 30, 32 may be connected together using the connectors 38 (such as hinge connectors) along one of the first lateral edges 34 and one of the second lateral edges 36. The speaker openings 58 can then be formed on the lateral surface 18, and the casters 52 mounted on the lower surface 16. The shelf 54 can then be inserted within the wine barrel, extending from the lateral surface 18. The speakers 56, the subwoofer 62, and the amplifier 66 may be then mounted to the housing 12.

In this manner, the housing 12 preferably resembles the wine barrel when the housing 12 is in the closed configuration. The housing 12 can also be transitioned into the open configuration, to allow for access to one or more of the speakers 56, the subwoofer 62, and the amplifier 66 and to allow for storage of materials within the housing 12 (such as on the shelf 54).

It will be appreciated by those skilled in the art that the preferred embodiments have been described in some detail but that certain modifications may be practiced without departing from the principles of the invention.

The invention claimed is:

1. An audio apparatus comprising:

a housing comprising:

a upper surface having an upper edge, the upper surface comprising first and second upper surfaces;

a lower surface having a lower edge, the lower surface comprising first and second lower surfaces;

a lateral surface extending from the upper edge to the lower edge, the lateral surface comprising:

first and second lateral surfaces; and one or more speaker openings; and one or more connectors;

wherein the first upper surface, the first lower surface, and the first lateral surface define, at least in part, a first portion of the housing;

wherein the second upper surface, the second lower surface, and the second lateral surface define, at least in part, a second portion of the housing; and wherein the first portion is connected to the second portion by the one or more connectors;

one or more speakers, each of the one or more speakers mounted over one of the speaker openings;

a subwoofer mounted to the lower surface; and an amplifier mounted to the housing, the amplifier in communication with the one or more speakers and with the subwoofer to generate sound from the one or more speakers and the subwoofer.

2. The audio apparatus of claim 1, wherein the one or more connectors are adapted to allow the housing to transition from an open configuration to a closed configuration and vice versa, wherein in the closed configuration, the upper surface and the lower surface are substantially circular, and wherein in the open configuration, the first and second portions are angled away from each other to allow for access to an interior of the housing.

3. The audio apparatus of claim 2, wherein the first upper surface comprises a first upper curved edge and a first upper linear edge, wherein the second upper surface comprises a second upper curved edge and a second upper linear edge, and wherein in the closed configuration, the first upper linear edge and the second upper linear edge meet, and the first upper curved edge and the second upper curved edge form substantially a circle.

4. The audio apparatus of claim 2, wherein the first lower surface comprises a first lower curved edge and a first lower linear edge, wherein the second lower surface comprises a second lower curved edge and a second lower linear edge, and wherein in the closed configuration, the first lower linear edge and the second lower linear edge meet, and the first lower curved edge and the second lower curved edge form substantially a circle.

5. The audio apparatus of claim 1, wherein the one or more connectors are hinge connectors that are adapted to allow the first and second portions to move hingedly with respect to each other.

6. The audio apparatus of claim 1, wherein the housing further comprises one or more shelves extending from the lateral surface into an interior of the housing.

7. The audio apparatus of claim 1, wherein the housing further comprises a plurality of casters mounted to the lower surface.

8. The audio apparatus of claim 1, wherein the one or more speaker openings comprise two speaker openings, and the one or more speakers comprise two speakers.

9. The audio apparatus of claim 8, wherein the two speaker openings are horizontally aligned with each other.

10. The audio apparatus of claim 9, wherein the two speaker openings are angled between approximately 90° and 150° apart from each other.

11. The audio apparatus of claim 10, wherein the two speaker openings are angled approximately 120° apart from each other.

12. The audio apparatus of claim 9, wherein the lateral surface further comprises a lateral opening horizontally aligned with the two speaker openings and located midway between the two speaker openings.

13. The audio apparatus of claim 1, wherein the housing is in a shape of a wine barrel.

14. The audio apparatus of claim 13, wherein the housing is constructed from a wine barrel.

15. The audio apparatus of claim 1, wherein the first portion is larger than the second portion.

16. The audio apparatus of claim 15, wherein the first portion is between approximately 50% and 75% of a volume of the housing.

17. The audio apparatus of claim 15, wherein the speaker openings are on the first lateral surface.

18. The audio apparatus of claim 15, wherein the subwoofer is mounted to the first lower surface.

19. The audio apparatus of claim 15, wherein the amplifier is mounted to the lateral surface.

20. The audio apparatus of claim 19, wherein the amplifier is mounted to the first lateral surface.

* * * * *